(12) United States Patent
Knoblauch

(10) Patent No.: US 9,096,126 B2
(45) Date of Patent: Aug. 4, 2015

(54) DRIVE TRAIN OF A PURELY ELECTRICALLY ALL-WHEEL DRIVABLE MOTOR VEHICLE

(71) Applicant: Dr. Ing. h.c. F. Porsche Aktiengesellschaft, Stuttgart (DE)

(72) Inventor: Daniel Knoblauch, Obergruppenbach (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/359,675

(22) PCT Filed: Nov. 27, 2012

(86) PCT No.: PCT/EP2012/004886
§ 371 (c)(1),
(2) Date: May 21, 2014

(87) PCT Pub. No.: WO2013/083243
PCT Pub. Date: Jun. 13, 2013

(65) Prior Publication Data
US 2014/0284130 A1    Sep. 25, 2014

(30) Foreign Application Priority Data
Dec. 5, 2011    (DE) .......................... 10 2011 056 047

(51) Int. Cl.
*B60K 1/02* (2006.01)
*B60K 17/356* (2006.01)
(Continued)

(52) U.S. Cl.
CPC ................. *B60K 17/356* (2013.01); *B60K 1/02* (2013.01); *B60K 17/165* (2013.01); *B60K 17/35* (2013.01); *B60K 2001/001* (2013.01)

(58) Field of Classification Search
CPC ................................ B60K 17/356; B60K 1/02
See application file for complete search history.

(56) References Cited

U.S. PATENT DOCUMENTS 5,680,908 A * 10/1997 Reed .................. 180/65.245
6,615,946 B2    9/2003 Pasquini et al.
(Continued)

FOREIGN PATENT DOCUMENTS

AT        006 549       12/2003
DE     600 13 340        9/2005
(Continued)

OTHER PUBLICATIONS

International Search Report of Mar. 13, 2013.
(Continued)

*Primary Examiner* — Kevin Hurley
(74) *Attorney, Agent, or Firm* — Gerald E. Hespos; Michael J. Porco; Matthew T. Hespos

(57) ABSTRACT

A drive train (1) of a purely electrically all-wheel drivable motor vehicle has a first axle (2) with axle halves (7, 8) and a differential (9) connecting them, a second axle (3) with axle halves (4, 5) and a differential connecting them, and first and second electric machines (19, 20) for driving the axles (2, 3). The first electric machine (19) is connected via a first transmission (24) to one axle half (7) of the the first axle (2) and the second electric machine (20) is connected via a second transmission (25) to the other axle half (8) of the first axle (2). The two differentials (6, 9) are connected to each other via a shaft (13). The drive train provides an all-wheel drive with simple construction, and standardization.

14 Claims, 3 Drawing Sheets

(51) Int. Cl.
*B60K 17/35* (2006.01)
*B60K 17/16* (2006.01)
*B60K 1/00* (2006.01)

(56) References Cited

U.S. PATENT DOCUMENTS

2005/0023885 A1* 2/2005 Bennett ................ 301/124.1
2006/0191168 A1   8/2006 Casey et al.
2012/0217080 A1* 8/2012 Besler et al. ............ 180/233
2014/0335999 A1* 11/2014 Knoblauch ................ 477/5

FOREIGN PATENT DOCUMENTS

| DE | 10 2006 028 790 | 1/2008 |
| DE | 10 2010 005 789 | 7/2011 |
| EP | 1 634 756 | 3/2006 |
| WO | 98/45928 | 10/1998 |

OTHER PUBLICATIONS

German Search Report of Aug. 15, 2012.

* cited by examiner

DRIVE TRAIN OF A PURELY ELECTRICALLY ALL-WHEEL DRIVABLE MOTOR VEHICLE

BACKGROUND

1. Field of the Invention

The invention relates to a drive train of a purely electrically all-wheel drivable motor vehicle, with a first axle which has axle halves and a differential connecting the latter, with a second axle which has axle halves and a differential connecting the latter, and with two electric machines for driving the two axles.

2. Description of the Related Art

Such a drive train, which is usable for an electrically drivable earth-moving vehicle or for an agricultural vehicle with four-wheel drive, is known from DE 600 13 340 T2. In said drive train, the two electric machines are arranged longitudinally with respect to the direction of travel above the one, rear axle, and interact with a gearing which is arranged in front of the rear axle. The gearing is connected via one shaft or two shafts to the differentials which are assigned to the two axles, therefore the rear axle and the front axle.

It is the object of the present invention to provide a drive train of a purely electrically all-wheel drivable motor vehicle, which, with an arrangement of two electric machines in the region of an axle of the drive train, permits all-wheel drive, and therefore drive also of the other axle, with structurally simple, in particular standardized means.

SUMMARY OF THE INVENTION

The drive train of the purely electrically all-wheel drivable motor vehicle therefore has a first axle and a second axle. The first axle and the second axle are both divided. The first axle has the axle halves and a differential connecting the latter. The respective electric machine has, in particular, the function of an electric motor and of a generator, and therefore the electric machine as an electric motor serves for driving the respective axle and, in the function thereof as a generator, is driven via the respective axle.

It is essential in the case of the drive train according to the invention for one of the two electric machines, referred to as the first electric machine, to be directed via a first gearing to the one axle half of the first axle and for the other electric machine, referred to below as the second electric machine, to be connected via a second gearing to the other axle half of the first axle. Since the one electric machine is connected via the gearing assigned thereto to the one axle half of the first axle, and the other electric machine is connected via the gearing assigned thereto to the other axle half of the first axle, individual wheel drives of the first axle and therefore torque vectoring are possible.

In order now also to drive the second axle of the drive train, according to the invention the two halves of the first axle, which bear the left and right wheel of the motor vehicle, are connected to each other via the differential. Both this differential of the first axle and the differential of the second axle are connected via a shaft.

Owing to the connection of the two electric machines via the gearings assigned thereto to the axle halves of the first axle and via the differential assigned to said first axle, the torque introduced into the first axle via the electric machines is, as it were, mixed in the region of said differential and a portion of torque from said differential is introduced via the shaft into the differential assigned to the second axle.

The drive train is preferably used in a motor vehicle which is in the form of a passenger vehicle. Said passenger vehicle is in particular a sports car. Said motor vehicle, in particular the passenger vehicle or the sports car, is preferably in the form of rear drive. The two electric machines are therefore arranged in the rear region of the motor vehicle or of the drive train. In the force flux in the path of the two electric machines arranged in the rear region of the drive train, first of all the first, rear axle is driven and, from there via the shaft, the second, front axle is driven.

It is considered to be particularly advantageous if the two electric machines are arranged behind the rear axle, and therefore behind the first axle.

In principle, however, the motor vehicle may be in the form of front drive.

The wheels assigned to the drive train are connected thereto in particular individually via propeller shafts. The drive train therefore does not have a rigid axle.

It is considered to be particularly advantageous if the two electric machines are arranged transversely with respect to the direction of travel of the motor vehicle. Under the aspect of a structurally particularly simple design of the drive train, it is advantageous here if the axes of rotation of the rotors of the electric machines are identical. The electric machines are therefore arranged next to each other with respect to the direction of travel of the motor vehicle. In particular, the electric machines are arranged symmetrically to a longitudinal center axis relating to the two axles. This substantially permits a symmetrical distribution of weight of the individual components of the drive train with respect to the central longitudinal plane of the drive train.

According to a preferred embodiment of the invention, provision is made for the respective electric machine to be connected via a spur gear toothing to the associated axle half of the first axle in order to drive the latter. This design makes it possible to form the respective gearing with structurally simple, in particular standardized means. Furthermore, it is considered to be advantageous if the differential of the first axle and/or of the differential of the second axle have/has a crown wheel. In an embodiment with two crown wheels, the latter are connected to each other in particular via the shaft. The shaft has, in the region of the averted ends, pinions which interact with the crown wheels. Since a respective pinion engages in a respective crown wheel, a torque mixed in the differential of the first axle is therefore transmitted from the two halves of the first axle, by means of the shaft, to the second shaft. The pinions assigned to the shaft and/or the corresponding crown wheels can differ in size, and therefore different transmission ratios are brought about in conjunction with the associated crown wheels.

This results in the simple possibility of electrically fitting a purely electrically driven vehicle with only one drive axle with all-wheel without an additional electric machine for the other axle. In particular, the possibility arises of using, for essentially partial regions of the drive train according to the invention, technology which is already known from conventional all-wheel vehicles, thus technology which is used in known all-wheel vehicle wheels driven by means of internal combustion engines. This relates in particular to the transmission of torque by the first axle to the second axle. For example, it is known that the shaft additionally has a controllable clutch, in particular a hang-on clutch. The shaft can also be designed in a known manner as a propeller/cardan shaft. There is in particular the possibility of using a combination, which is already known for conventional all-wheel vehicles, of propeller/cardan shaft with hang-on clutch and connected vehicle axle, in the drive train according to the invention, without further modifications.

According to a particularly preferred design, provision is made for the two gearings, in particular the spur gear toothings of the two gearings, and the differential of the first axle to have a common housing. In particular, the housing is of two-part design and, in particular, has two housing shells. Said housing requires bearings which are separate in each case for the respective left and right bearings of the shafts of the two gearings of the two spur gear stages, i.e. a total in each case of four coaxially arranged bearing points per shaft. In order nevertheless to permit a simply constructed housing, with only two housing shells together with respective bearings on the two outer sides of the housing shells, it is proposed, instead of the in each case two central bearings of the shafts, now to provide needle bearings for the respective two shafts, said needle bearings then being mounted one in the other. By use of the needle bearings, the central bearings can be omitted, and therefore two simply constructed housing halves can be used.

Further features of the invention emerge from the dependent claims, the attached drawing and the description of the preferred exemplary embodiments, which are reproduced in the drawing, without being limited thereto.

DETAILED DESCRIPTION OF THE PREFERRED EMBODIMENTS

Figure 1:
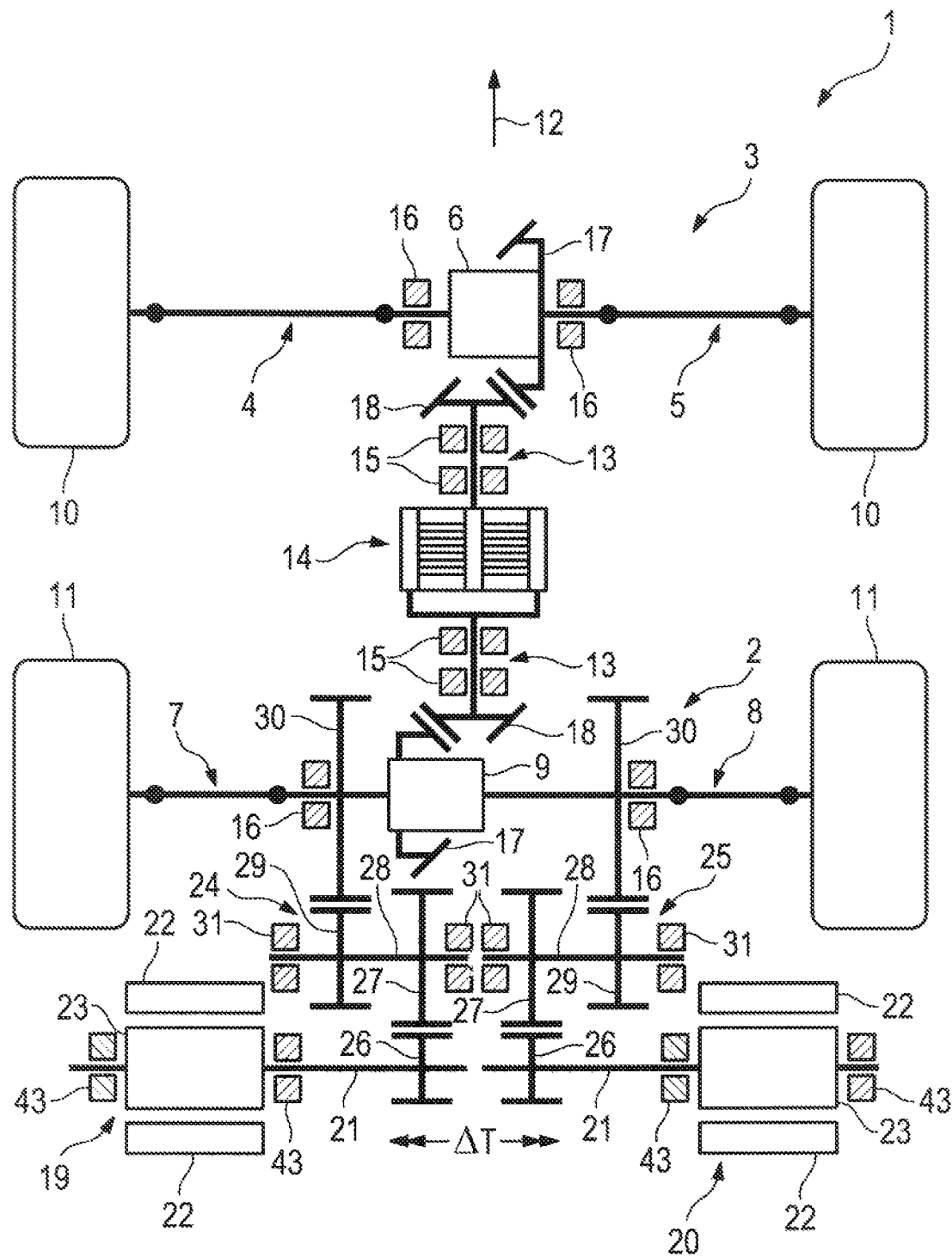
FIG. 1 shows a schematic diagram of a first embodiment of the drive train according to the invention.

The exemplary embodiment according to FIG. 1 illustrates a drive train 1 for a purely electrically all-wheel drivable motor vehicle, which is, in particular, a passenger vehicle, specifically a sports car.

The drive train 1 with individual wheel suspension has a first, rear axle 2 and a second, front axle 3. The rear axle 2 has two axle halves 7 and 8 having propeller shafts. A differential 9 connects said axle halves. The front axle 3 has two axle halves 4 and 5 having propeller shafts. A differential 6 connects said axle halves. Front wheels 10 are connected to the two axle halves 4 and 5, and rear wheels 11 are connected to the axle halves 7 and 8.

The forward direction of travel, referred to in short below as direction of travel, is illustrated by the arrow 12.

The two differentials 6 and 9 are connected by means of a shaft 13, which is designed in particular as a propeller shaft or cardan shaft. The shaft has a controllable clutch, in particular in the manner of a hang-on clutch 14, in order, in particular, to couple or to decouple the two axles 2 and 3. The shaft 13 is mounted with the clutch 14 in bearings 15 arranged on both sides of the clutch 14. The bearings of the axle halves 4 and 5 of the front axle 3 and the bearings of the axle halves 7 and 8 of the rear axle 2 are denoted by the reference number 16. In the region of the ends averted from the wheels 10, 11, the axle halves 4 to 8 are mounted in the differentials 6 and 7, respectively.

The respective differential 6 or 9 has a crown wheel 17. The crown wheels 17 interact with pinions 18 which are arranged at averted ends of the shaft 13 and are connected to the shaft 13. The crown wheels 17 and/or the pinions 18 can differ in size.

The drive train 1 has two electric machines 19, 20 which are arranged transversely with respect to the direction of travel 12 of the motor vehicle. The axes of rotation of the two electric machines 19 and 20 illustrated by the respective driven shafts 21 of said electric machines, are identical. The stator of the respective electric machine 20 is denoted by the reference number 22, and the rotor of the respective electric machine 20, to which rotor the driven shaft 21 is connected, is denoted by the reference number 23. The respective rotor 23 and the respective driven shaft 21 are mounted in, for example, two bearings 43. The one, first electric machine 19 is connected via a first gearing 24 to the axle half 7 of the rear axle 2, and the other, second electric machine 20 is connected via a second gearing 25 to the other axle half 8 of the rear axle 2. Each gearing 24 or 25 is designed as a spur gearing and therefore has a spur gear toothing. Specifically, the respective gearing 24 or 25 has a pinion 26 which is connected to the driven shaft 21 for rotation therewith, and a spur gear 27 meshing with said pinion, wherein said spur gear is mounted in an intermediate shaft 28 and is connected thereto for rotation therewith. A pinion 29 which interacts with a spur gear 30 is connected to the respective intermediate shaft 28, on that side of said intermediate shaft 28 which faces the rear wheel 11. The respective spur gear 30 is mounted in the axle half 7 or 8 and is connected thereto for rotation therewith. Each of the two intermediate shafts 28 is mounted in the region of the averted ends thereof in bearings 31. The axes of rotation of the two intermediate shafts 28 are identical.

The two gearings 24 and 25 and the differential 9 of the rear axle 2 are arranged in a common housing. Since the two electric machines 19, 20 and gearings 24, 25 and spur gear toothings are formed separately from one another, an individual wheel drive of the wheels 11 of the rear axle 2, and therefore torque vectoring, is possible. In order also to drive the front axle 3, the two axle halves 7 and 8 of the rear axle 2 are connected to each other via the differential 9. The torque mixed in said differential 9 is therefore transmitted by the axle halves 7 and 8 of the rear axle 2 to the front axle 3 by means of the shaft 13. This produces the possibility of using a combination of propeller/cardan shaft 13 with hang-on clutch 14 and connected vehicle axle, which combination is already known from conventional all-wheel vehicles, and therefore from all-wheel vehicles driven by means of an internal combustion engine, in a purely electrically drivable vehicle, without further modifications.

The possibility of torque vectoring is illustrated in the figure by the indication ΔT. By this means, different torques can be introduced into the axle halves 7, 8.

The drive train of the embodiment according to FIG. 1 requires separate bearings in each case for the left and right bearing points in each case of the axles of the two spur gear stages and the axle halves of the rear axle, i.e. a total of four coaxially arranged bearing points per axle.

Figure 2:
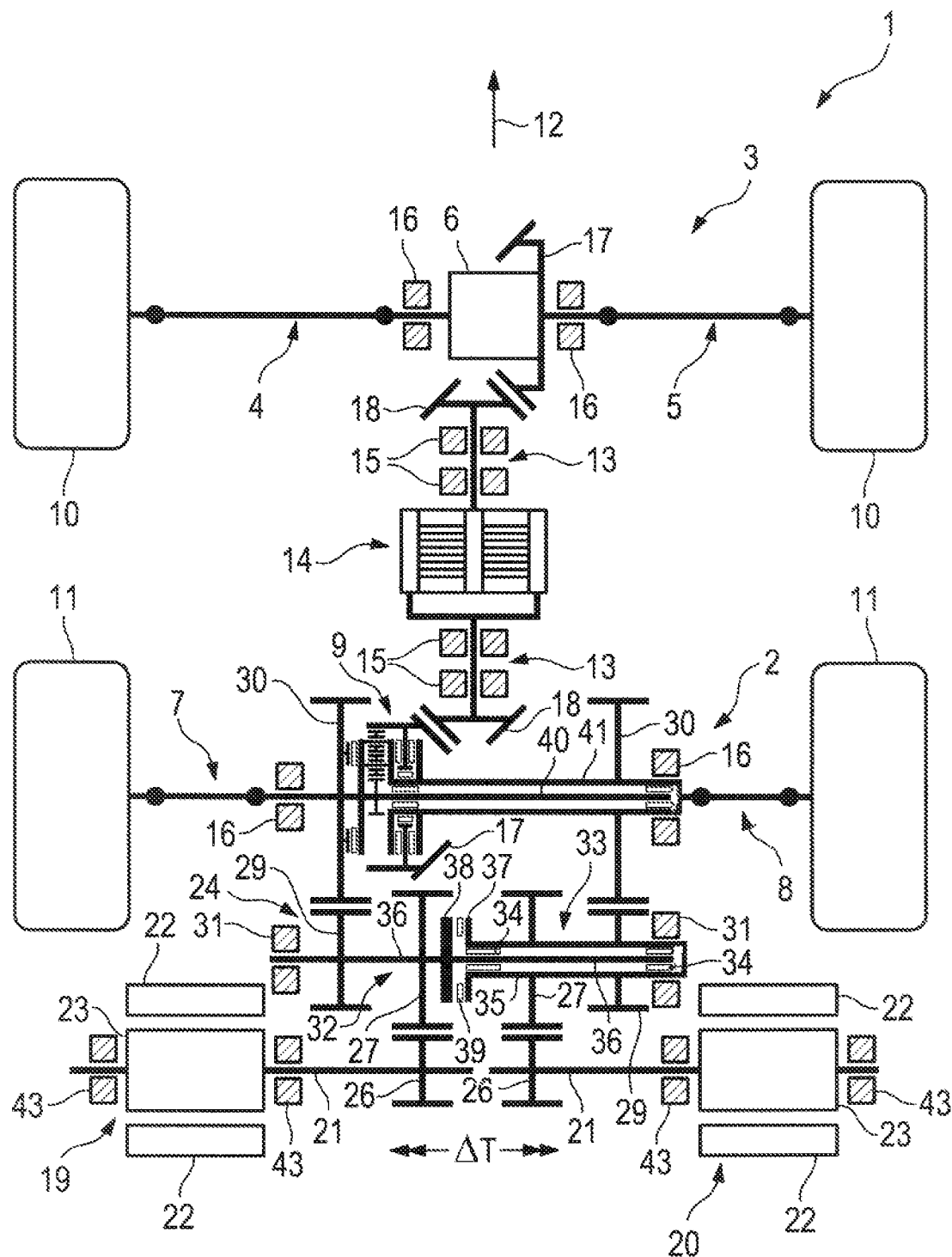
FIG. 2 shows a schematic diagram of a second embodiment of the drive train according to the invention.
Figure 3:
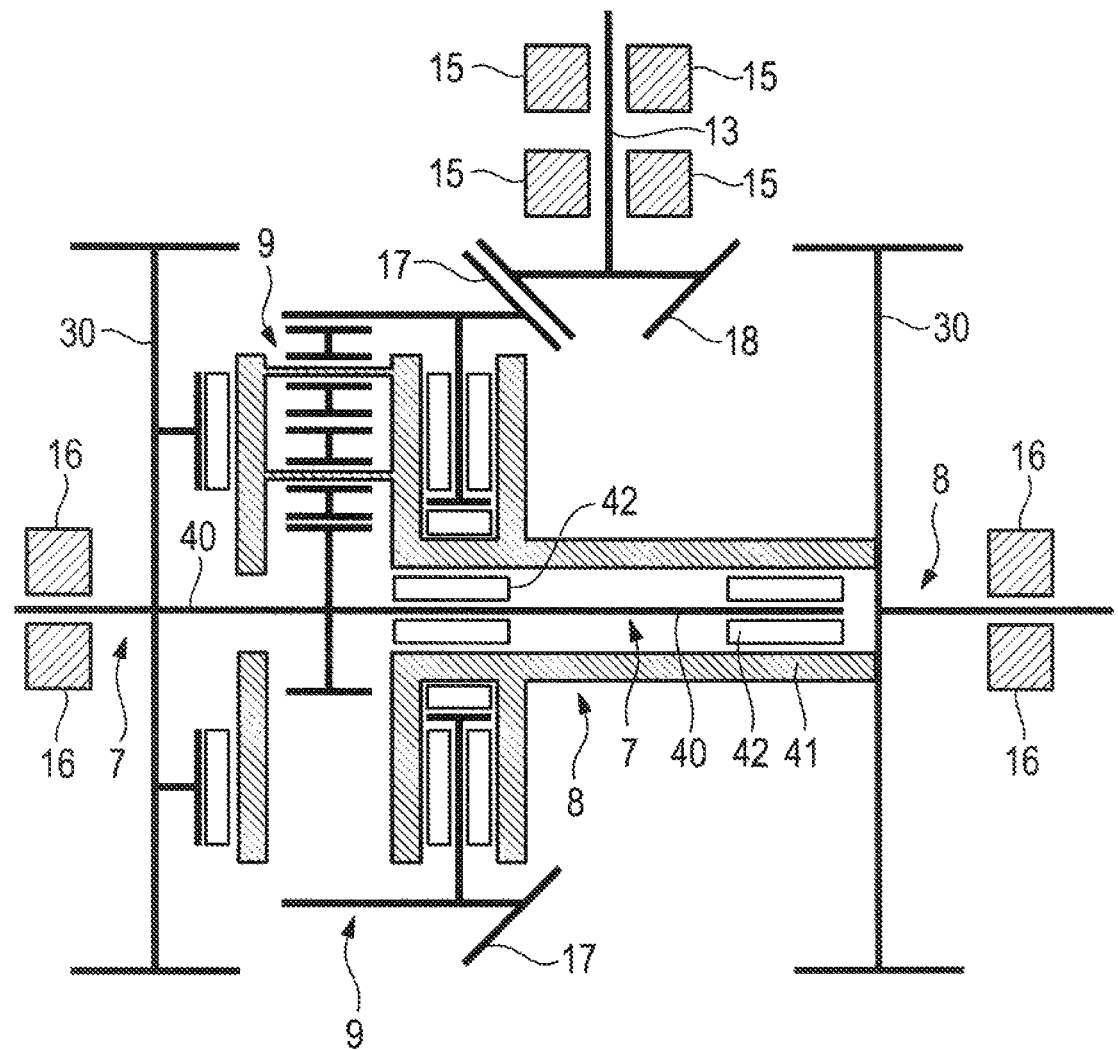
FIG. 3 shows, in an enlarged illustration, a partial region of the drive train illustrated in FIG. 2.

The exemplary embodiment of a drive train according to the illustration of FIGS. 2 and 3 illustrates a modified mounting of the axles. This makes it possible to use a simply constructed housing with only two housing shells together with respective bearings on the two outer sides of the housing shells. In this case, instead of the in each case two central bearings of the axles as per the embodiment according to FIG. 1, needle bearings are provided in the embodiment according to FIGS. 2 and 3. By use of the needle bearings, the central bearings can be omitted and therefore two simply constructed housing halves can be used.

In the embodiment of FIGS. 2 and 3, drive train parts corresponding to the embodiment according to FIG. 1 have been denoted by reference numbers which correspond to reference numbers in FIG. 1. The modification of the embodiment of FIGS. 2 and 3 in relation to the embodiment according to FIG. 1 is discussed in detail below.

FIG. 2 basically illustrates that only two outer bearings 31, which are mounted in the housing, are necessary for the mounting of the two intermediate shafts 32, 33, while the and the intermediate shaft 32 is mounted in the intermediate shaft 33 by means of two needle bearings 34. The intermediate shaft 33 has a tubular section 35 for receiving the undulating section 36 of the intermediate shaft 32, said section 36 passing through the section 35. That region of the section 36 which is arranged within the section 35 is mounted radially in the section 35 by means of the two needle bearings 34. A flange section 37 extends perpendicularly to the section 35 of the intermediate shaft 33, and a flange section 38 extends perpendicularly to the section 36 of the intermediate shaft 22. A further needle bearing 39 which serves for the axial mounting of the intermediate shaft 32 and of the intermediate shaft 33 is arranged between the two flange sections 37 and 38. On the sides thereof which face the rear wheels 11, the section 36 of the intermediate shaft 32 and the section 35 of the intermediate shaft 33 are mounted in the bearings 31.

The mounting of the axle halves 7 and 8 takes place in a manner corresponding to the plugged-together mounting of the intermediate shafts 32, 33, with the needle bearings 34 and 39 provided in this connection. This detail is illustrated in enlarged form in FIG. 3, with a certain modification taking place there because of the planetary differential which is present.

A torque is introduced by the two spur gears 33 into the axle halves 7 and 8 independently because of the action of the two electric machines 19 and 20. Said axle halves 7 and 8 are mounted on the side thereof facing the rear wheels 11 in the bearings 16. Said bearings, in precisely the same manner as the bearings 31 according to this embodiment, are housing-side bearings, wherein the bearings 16 and 31 which are assigned to the one rear wheel 11 are mounted in the one housing half, while the bearings 16 and 31 which are assigned to the other rear wheel 11, are mounted in the other housing half of the housing. The housing itself is not illustrated.

The axle half 7 is inserted with a section 40 into a tubular section 41 of the axle half 8, and two needle bearings 42 are provided for the radial mounting of the sections 40 and 41. With this mounting of the two axle halves 7 and 8, the two central bearings provided in the embodiment according to FIG. 1 can therefore be omitted and replaced by needle bearings. The differential 9 which is in the form of a planetary differential and likewise has needle-bearing bearing components is arranged in the torque flux between the section 40 of the axle half 7 and the section 41 of the axle half 8.

Therefore, as per the embodiment according to FIGS. 2 and 3, a drive train 1 is proposed, in which a common housing is provided for the gearings 24 and 25 and the differential 9, with two housing shells, wherein the respective shafts of the gearing and of the lower axle 2 are not mounted centrally in the housing, but rather, instead, the shafts assigned to the respective axle have a needle mounting one inside the other.

The invention claimed is:

1. A drive train of a purely electrically all-wheel drivable motor vehicle, comprising: a rear axle that has first and second rear axle halves and a rear differential connecting the rear axle halves, a front axle that has first and second front axle halves and a front differential connecting the front axle halves, and first and second electric machines arranged behind the rear axle of the motor vehicle for driving the front and rear axles, the first electric machine being connected via a first gearing to the first rear axle half of the rear axle and the second electric machine being connected via a second gearing to the second rear axle half of the rear axle, and the front and rear differentials are connected via a shaft.

2. The drive train of claim 1, wherein the two electric machines are arranged transversely with respect to a direction of travel of the motor vehicle.

3. The drive train of claim 2, axes of rotation of rotors of the electric machines are identical.

4. The drive train of claim 1, wherein the respective gearing has a spur gear toothing, and the respective electric machine is connected via the spur gear toothing to the associated axle half of the rear axle.

5. The drive train of claim 1 to, wherein the differential of the rear axle and/or the differential of the front axle has a crown wheel.

6. The drive train of claim 5, wherein the two crown wheels are connected to each other via the shaft, wherein outer end regions of the shaft have pinions that interact with the crown wheels.

7. A drive train of a purely electrically all-wheel drivable motor vehicle, comprising: a first axle that has left and right first axle halves and a differential connecting the left and right first axle halves, a second axle that has left and right second axle halves and a differential connecting the left and right second axle halves, and first and second electric machines for driving the first and second axles, the first electric machine being connected via a first gearing to the left first axle half of the first axle and the second electric machine being connected via a second gearing to the right first axle half of the first axle, and the two differentials are connected via a shaft, wherein the shaft has a controllable clutch.

8. The drive train of claim 7, wherein the first axle is a rear axle of the motor vehicle.

9. The drive train of claim 8, wherein the two electric machines are arranged behind the rear axle of the motor vehicle.

10. A drive train of a purely electrically all-wheel drivable motor vehicle, comprising: a first axle that has left and right first axle halves and a differential connecting the left and right first axle halves, a second axle that has left and right second axle halves and a differential connecting the left and right second axle halves, and first and second electric machines for driving the first and second axles, the first electric machine being connected via a first gearing to the left first axle half of the first axle and the second electric machine being connected via a second gearing to the right first axle half of the first axle, and the two differentials are connected via a shaft, wherein the two axle halves of the first axle are mounted one in the other by needle bearings.

11. The drive train of claim 10, wherein the two axle halves of the first axle are mounted in regions of outer sides of the housing shells.

12. A drive train of a purely electrically all-wheel drivable motor vehicle, comprising: a first axle that has left and right first axle halves and a differential connecting the left and right first axle halves, a second axle that has left and right second axle halves and a differential connecting the left and right second axle halves, and first and second electric machines for driving the first and second axles, the first electric machine being connected via a first gearing to the left first axle half of the first axle and the second electric machine being connected via a second gearing to the right first axle half of the first axle, and the two differentials are connected via a shaft, wherein the two gearings and the differential of the first axle have a common housing with two housing shells.

13. A drive train of a purely electrically all-wheel drivable motor vehicle, comprising: a first axle that has left and right first axle halves and a differential connecting the left and right first axle halves, a second axle that has left and right second axle halves and a differential connecting the left and right second axle halves, and first and second electric machines for driving the first and second axles, the first electric machine being connected via a first gearing to the left first axle half of the first axle and the second electric machine being connected via a second gearing to the right first axle half of the first axle, and the two differentials are connected via a shaft, wherein the respective gearing, has an intermediate shaft between a driven shaft of the electric machine assigned to said gearing and the axle half assigned to the electric machine, of the first axle, and wherein the intermediate shafts of the two gearings are mounted one in the other by needle bearings.

14. The drive train of claim 13, wherein the two intermediate shafts are mounted in the gearing shells, in a region of outer sides thereof.

\* \* \* \* \*